United States Patent [19]

Portron et al.

[11] Patent Number: 5,745,185
[45] Date of Patent: Apr. 28, 1998

[54] METHOD OF SYNCHRONIZATION OF A DIGITAL VIDEO SIGNAL AND DEVICE FOR APPLICATION OF THE METHOD

[75] Inventors: Isabelle Portron, Versailles; Alain DeMay, Sartrouville; Philippe Le Queau, Courbevoie, all of France

[73] Assignee: Thomson Broadcast, Cergy-Pontoise Cedex, France

[21] Appl. No.: 599,932

[22] Filed: Feb. 12, 1996

[30] Foreign Application Priority Data

Mar. 13, 1995 [FR] France ................................ 95 02877

[51] Int. Cl.⁶ .................................................. H04N 9/475
[52] U.S. Cl. .................................................. 348/513; 348/512
[58] Field of Search .................................. 348/510, 512, 348/513, 514, 536, 537, 565, 542, 543, 544, 515, 516, 518, 519, 520, 497, 498, 715, 716; H04N 9/475

[56] References Cited

U.S. PATENT DOCUMENTS

| | | | |
|---|---|---|---|
| 4,018,990 | 4/1977 | Long et al. | |
| 4,134,131 | 1/1979 | Hopkins et al. | 358/149 |
| 4,231,063 | 10/1980 | Ito et al. | 358/148 |
| 4,646,136 | 2/1987 | Kouyama | 358/19 |
| 4,646,151 | 2/1987 | Welles et al. | 358/149 |
| 4,689,676 | 8/1987 | Nakajima et al. | 358/149 |
| 4,766,495 | 8/1988 | Kobayashi et al. | 358/148 |
| 4,816,915 | 3/1989 | Imai et al. | 358/183 |

FOREIGN PATENT DOCUMENTS

| | | |
|---|---|---|
| 0 415 268 A3 | 3/1991 | European Pat. Off. . |
| 2 191 906 | 12/1987 | United Kingdom . |
| WO 93/10627 | 5/1993 | WIPO . |

OTHER PUBLICATIONS

Patent Abstracts of Japan, vol. 018, No. 441 (P–1788), Aug. 17, 1994, & JP-A-06 139133 (Sony Corp), May 20, 1994.

*Primary Examiner*—Michael R. Lee
*Attorney, Agent, or Firm*—Oblon, Spivak, McClelland, Maier & Neustadt, P.C.

[57] ABSTRACT

The disclosure relates to a synchronization device that includes two parallel memory areas, a unit for determination of write states that depends on the phase deviation between the input video signal and the synchronization signal, a write management unit that determines, when it receives a write image pulse, the memory (or memories) to be used for the next write depending on the write state and the memory that is currently being read. The two memories are read sequentially and alternately, whereas the memory(ies) used for each write is variable and determined automatically. The invention enables video signals to be synchronized with respect to a synchronization signal with a frequency deviation tolerance of up to 33%.

13 Claims, 8 Drawing Sheets

✕ POINT OF THE CONSERVED FRAME

◯ POINT INTERPOLATED FROM THE FOUR CONSERVED POINTS

METHOD OF SYNCHRONIZATION OF A DIGITAL VIDEO SIGNAL AND DEVICE FOR APPLICATION OF THE METHOD

BACKGROUND OF THE INVENTION

The present invention relates to a method and device for synchronization of a digital video signal with respect to a synchronization signal by means of a memorization unit in which the video signal to be synchronized is written at its own frequency and then read at the frequency of the synchronization signal in order to constitute a synchronized digital video signal.

DESCRIPTION OF THE PRIOR ART

At present, a video image is composed of two successive frames. A video signal comprises a succession of images whose rate is defined by a clock that generates a video signal frequency. The precision of the clock and of the devices, and the conditions of transmission of the video signal are such that the video signal received by a receiver has a frequency that is not strictly steady.

In an image production center, such as a television studio, video images are commonly assembled by taking sequences from several different sources by switching between the video signals from these sources. Frequency irregularities and phasing errors in the various signals can, when these signals are switched, lead to parasitic interference in the video signal sequence.

To resolve this problem a synchronization technique is used that consists in synchronizing the frequencies of the video signals with respect to a reference frequency called the synchronization frequency. In this way the video images taken from different sources are made synchronous before being assembled into sequences of video images in the TV studio.

In known systems of synchronization, a synchronization device or synchronizer is needed for the synchronization of a video signal from a single source outside the studio. A separate synchronizer is required for each external source in order to make the video signals synchronous with the video signals from image sources (cameras, VCRs, etc.) in the studio. The synchronizer includes a memory in which a video signal is written at the frequency of a video signal received and is then reread at the synchronization frequency generated by the studio. This ensures that the video signal reread from the memory is synchronized.

For the production of news programs, for example, outside video image sources are frequently used. The greater the number of these sources, the greater the number of synchronizers required to handle the external video signals and make them synchronous with the synchronization signal in the studio. This increases the overall cost (synchronizers and connecting cables) and the space required for equipment in the studio. To overcome this problem it might be envisage to use a single synchronizer to handle at least two external video sources. However, present synchronizer technologies are unable to process two out-of-phase video signals from two different sources during their switching.

SUMMARY OF THE INVENTION

The present invention offers a simple and efficient solution to the problem described above by proposing a synchronization method and device of a special design.

Another purpose of the invention is to propose a synchronizer that can synchronize a video signal produced by switching between several video sources, while eliminating parasites created when switching between two different video sources.

Another object of the invention is to create a sharp image during a suppression of the video signal or when freezing on an image.

Yet another object of the invention is a synchronization technique that has a large tolerance of frequency deviations of the video signal. The invention is a method of synchronization of a digital video signal with respect to a synchronization signal, making use of a memorization unit in which said video signal is written at its own frequency, then re-read at the frequency of said synchronization signal to provide a synchronized video signal, wherein said method consists in:

defining two memory areas in a memorization unit, each of which can store a video image;

reading sequentially and alternately the video images stored in said memory areas;

defining several write states according to the phase difference between the start of writing and the start of reading of an image and to the previous write state, and also the conditions for changing from one state to another;

at the start of each write, determining the memory area to be written and also the write state, in order to write the image in one or both of said memory areas.

The synchronization device according to the invention includes a memorization unit with two memory areas each of which can contain a video image, means of determining the write states as a function of the phase difference between the start of the write and the start of read and of the state of the previous write, means of determination of the memory area(s) into which each image is to be written taking into account the write state and the memory area being read.

According to the invention, at the start of each write of an image we detect the phase difference between the input video signal and the synchronization signal. This phase difference is characterized by three states according to a predetermined criterion. Depending on the write state and the memory zone being read, the video image will be memorized in one memory area only or in both areas simultaneously. In this way it is possible to conserve a phase difference between the writing of an image and its reading beyond a predetermined threshold.

When the frequency of the video signal is higher or lower than that of the synchronization signal there is a slippage or deviation of the video signal frequency that changes the phase difference between the start of one write and the start of the next one. If this frequency deviation is such that the write tends to "catch up" on the read in the same memory area by exceeding a pre-defined threshold, the invention enables an image to be deleted, in which case the synchronized video signal will carry one less image than the input signal. Inversely, if the read tends to catch up on the write in the same memory area by exceeding the same threshold, the invention enables an image to be frozen and interpolated. Of course, the deletion or freezing of an image are performed automatically as a function of the write states according to pre-defined criteria.

BRIEF DESCRIPTION OF THE DRAWINGS

The invention will be better understood and other advantages and characteristics will become clear on reading the following description of a particular embodiment taken only as a non-limitative example, making reference to the appended figures, of which.

Figure 1:
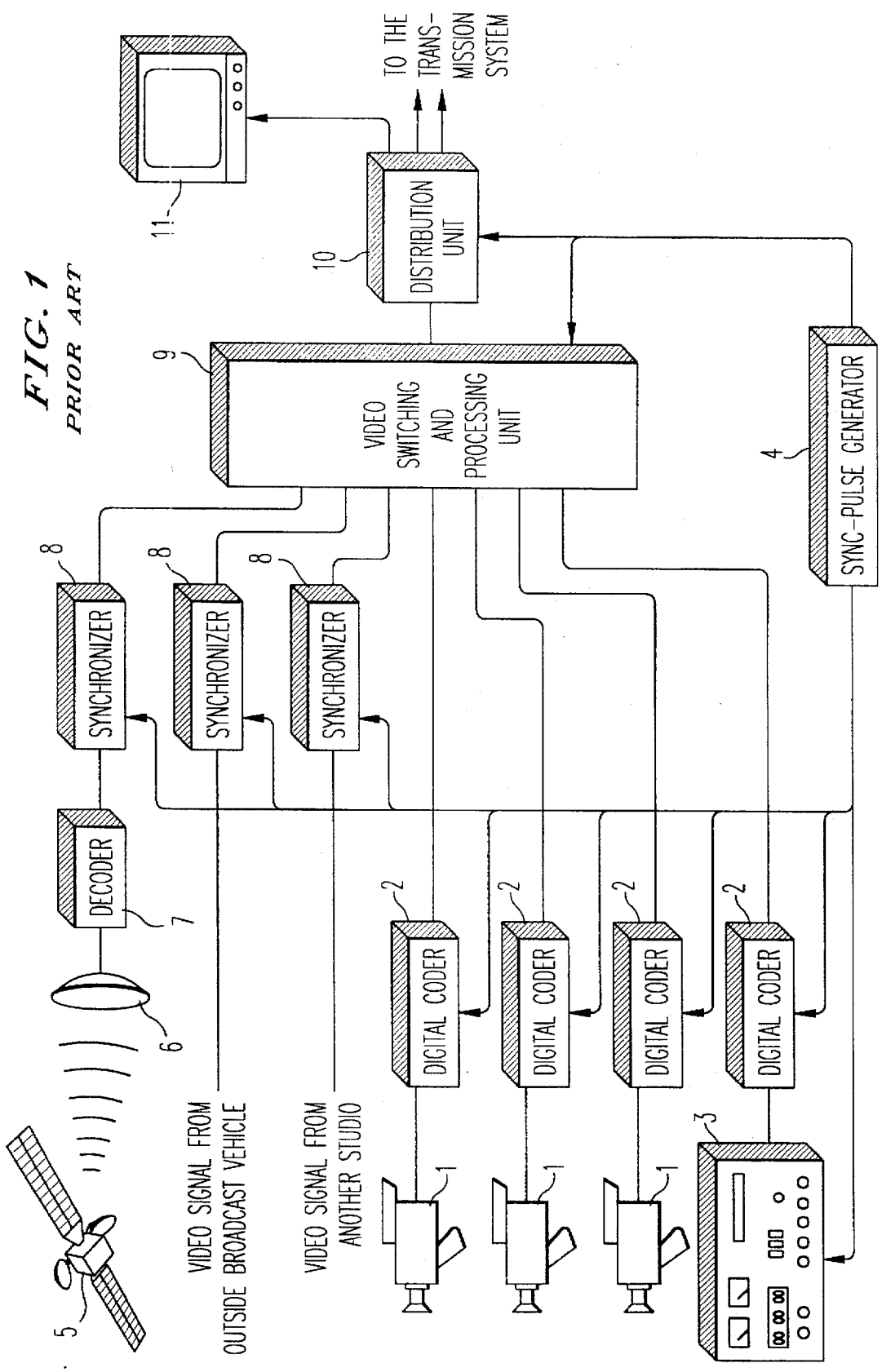
FIG. 1 is a block diagram of a television studio installation including prior art synchronizers.

Prior-art TV studios (FIG. 1) are equipped with a number of cameras 1 mounted in parallel. The video signal from each camera I is digitized by a digital coder 2. In addition to the cameras 1 there are one or more video cassette recorders (VCR) 3 that can be used to supply video signals that are digitized by the digital coders 2. All the cameras 1, digital coders 2 and VCRs 3 within the TV studio are synchronized with a reference frequency from a sync-pulse generator 4.

The TV studio is generally equipped with receiving devices to receive video signals from sources outside the studio. For example, to receive a video signal from a satellite 5 we use a parabolic antenna 6 equipped with a decoder 7 to input a digital video signal to a synchronizer 8. Similarly, we can receive and digitize video signals from an outside broadcast vehicle or another TV studio and input each of them to a synchronizer 8. We therefore need as many synchronizers 8 as there are external sources of video signals to be received.

The sync-pulse generator 4 sends the same reference frequency to all these synchronizers 8 so that at the input of the video switching and processing unit 9 the digital signals from the digital coders 2 and the synchronizers 8 are synchronous with the reference frequency of the synchronization signal and in phase with this signal. The video switching and processing unit 9 is used to process the video signals digitally and produce video sequences that are sent to the distribution unit 10. The video sequences in this distribution unit 10 are displayed on one or more monitors 11 to enable the operator to compose video sequences to be broadcast via the transmission system (not shown). The video switching and processing unit 9 and the distribution unit 10 are also synchronized by the sync-pulse generator 4.

Figure 2:
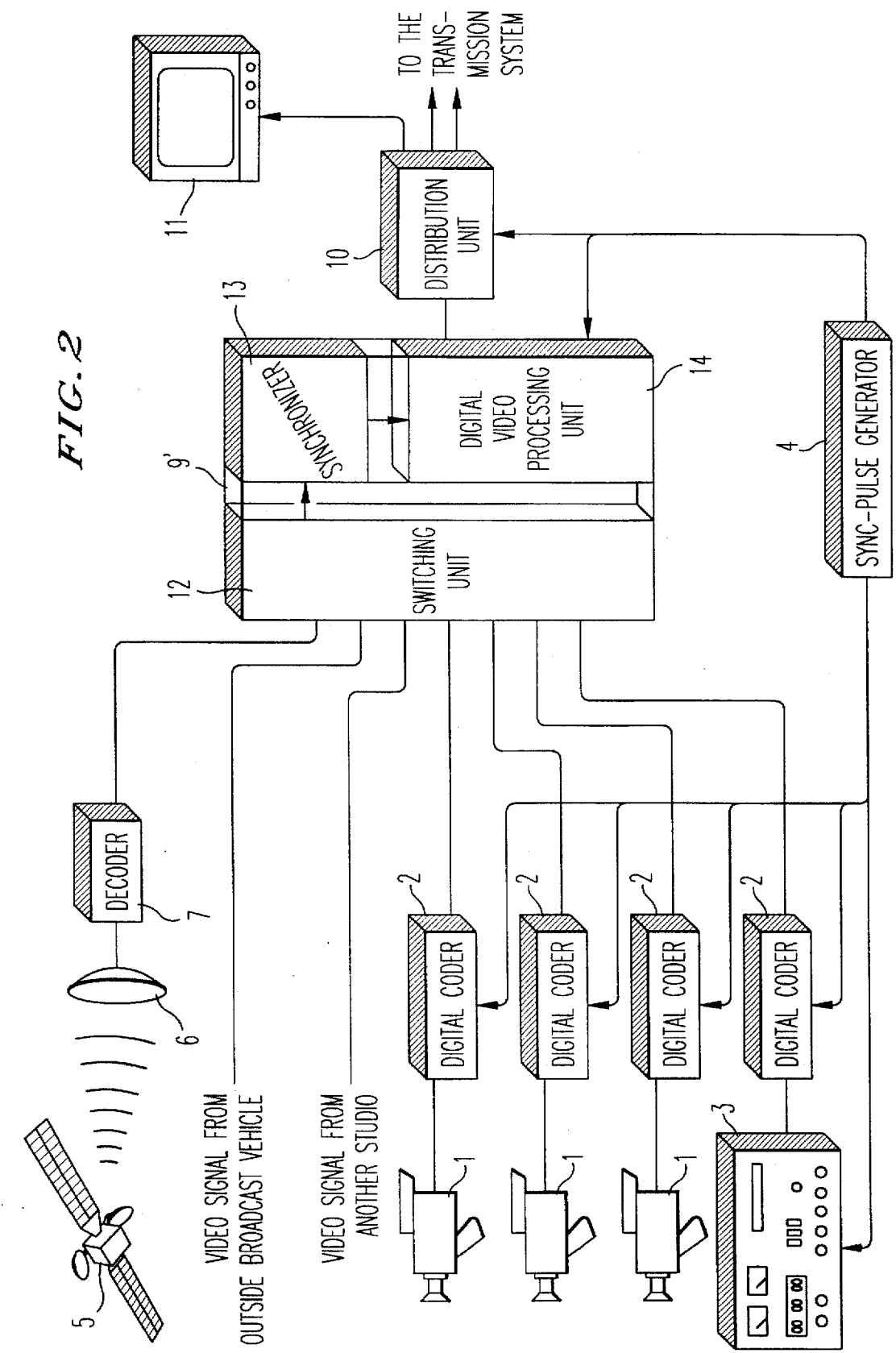
FIG. 2 is a block diagram of a television studio installation according to the invention.

FIG. 2 shows the same TV studio equipped with an installation according to the invention. The main difference compared with FIG. 1 concerns the central unit 9' that replaces all the synchronizers 8 and the video switching and processing unit 9 of FIG. 1. The parts of FIG. 2 that are common with FIG. 1 already having been described, we shall not describe them again here.

In FIG. 2, the digital video signal from the internal sources 1, 3 and the external sources are sent in parallel to the input of a switching unit 12 forming part of the central unit 9' that is synchronized by the sync-pulse generator 4.

The switching unit 12 is connected to the input of a synchronization device 13, or synchronizer, that may be enclosed in a separate case or integrated in the electronic architecture of the central unit 9'. The output of the synchronizer 13 is connected to the input of a digital video processing unit 14 to produce video sequences destined for the distribution unit 10. The switching unit 12 can be connected to the processing unit 14 in order to send it one or more digital video signals directly, rather than via the synchronizer 13; in this case, these signals are from internal sources 1, 3 and have already been synchronized by means of the sync-pulse generator 4.

We can see clearly in FIG. 2 that the invention enables replacement of the traditional synchronizers 8 associated with the external video sources by a single synchronizer 13 that is part of the central unit 9', thereby reducing the installation cost of the TV studio.

Figure 3:
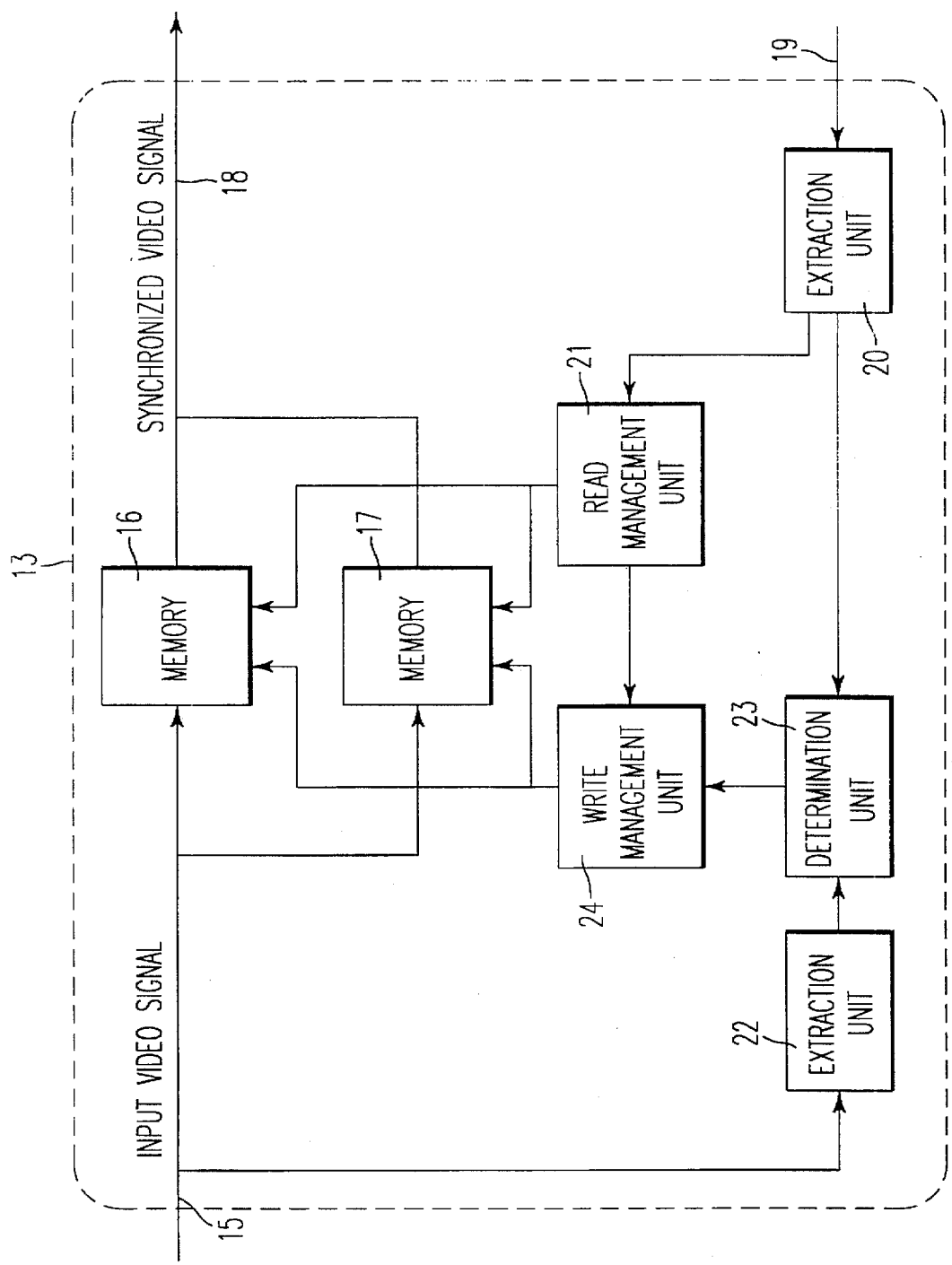
FIG. 3 is a block diagram explaining the operation of the synchronization device according to the invention.

FIG. 3 illustrates the operational principle of the synchronizer 13 of FIG. 2. The input video signal 15 is stored in a memorization unit that includes two memories 16, 17 in parallel, each of which can memorize a video image composed of two successive frames. The contents of memories 16, 17 are read sequentially in an alternating fashion. At the output of the synchronizer 13 the video signal is synchronized.

To control the sequential reading of the memories 16, 17, the synchronizer 13 receives a synchronization signal 19 from the sync-pulse generator 4 (FIG. 2), then an extraction unit 20 extracts the reference clock frequency and the "start image read" pip. A read management unit 21 sampled by the clock of the synchronization signal enables the reading of the memories 16, 17 to be controlled depending on the characteristics of the synchronization signal supplied by the extraction unit 20, and enables the memory 16 or 17 being read to be indicated in real time.

To control the writing of video images in the memories 16, 17, an extraction unit 22 extracts from the input video signal 15 the actual frequency of the input video signal and the "start image write" pip. These characteristics of the input video signal 15 are supplied to the unit 23 that determines the write state by comparing the phase difference between the image write pip supplied by the extraction unit 22 and the image read pip supplied by the extraction unit 20 and by taking account of the previous write state. A write management unit 24 sampled by the clock of the input video signal receives a signal indicating the write state from the determination unit 23. It also receives the indication of the number of the memory currently being read from the read management unit 21, with a view to controlling the writing of an image in one or other of the memories 16, 17 at each image write pip.

Figure 4:
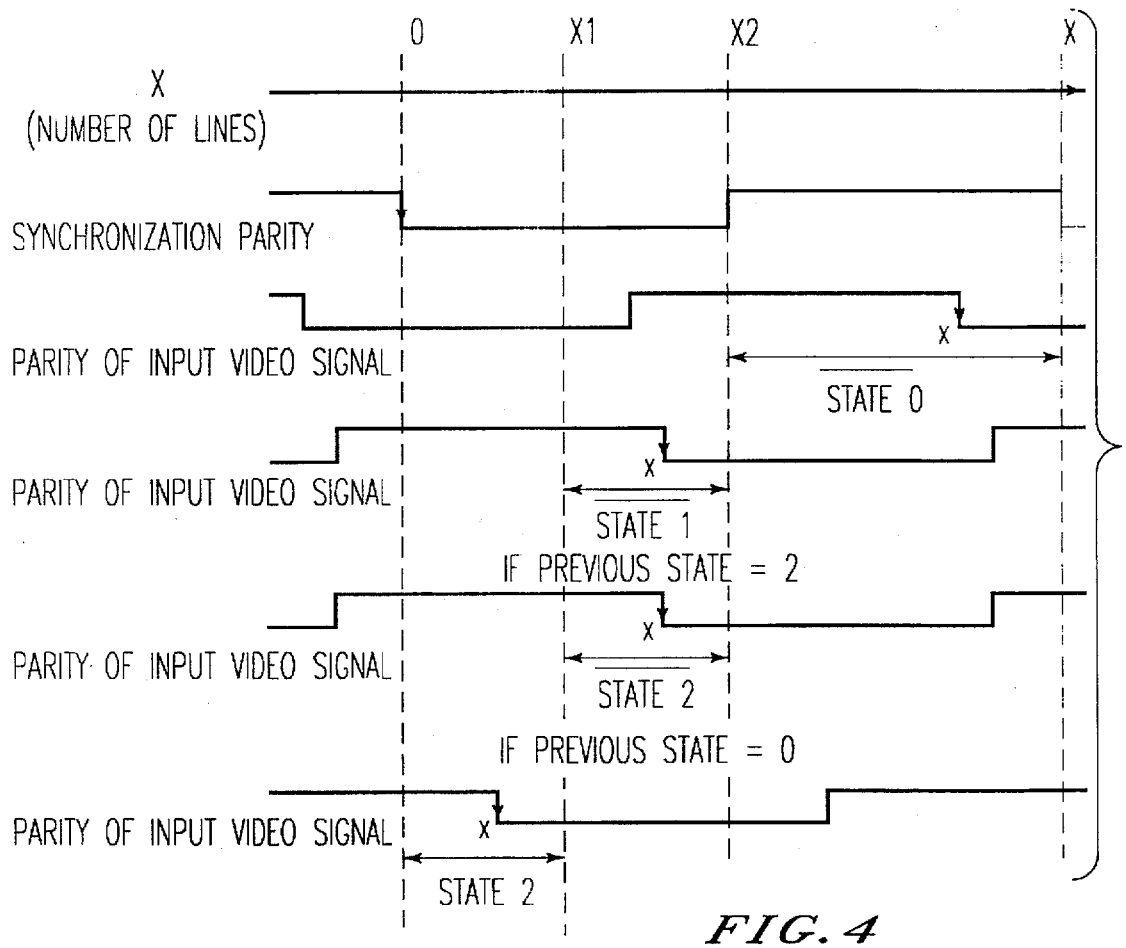
FIG. 4 is a diagram defining the write states of video images according to the invention.
Figure 5:
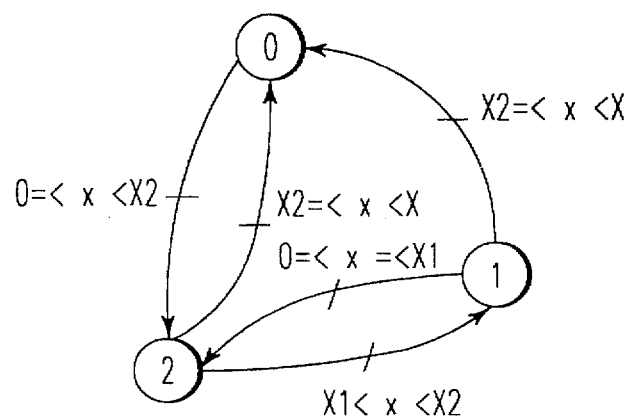
FIG. 5 is a diagram explaining the conditions for changes of the write state according to FIG. 4.

FIGS. 4 and 5 explain the principle of determination of the write states by the unit 23 (FIG. 3), according to the invention. The determination unit 23 contains counting means (not shown) that are reset to zero at each image read pip, which is constituted by the falling edge of each image according to the synchronization parity (FIG. 4). As for the image read pip, each image write pip is constituted by the falling edge of each image according to the parity of the input video (FIG. 4). Supposing that the image contains X scanning lines, we define three zones to determine three write states using two intermediate integers X1 and X2. To facilitate the description, we choose X1 to be substantially equal to X/4 (corresponding to half an image frame) and X2 substantially equal to X/2 (corresponding to one image frame).

The counter in the determination unit 23 counts the number of scanning lines x after the image read pip. When the image write pip arrives the number x counted represents the phase difference between the image write pip and the image read pip. According to the invention we define two normal write states (state 0 and state 2) and one intermediate write state (state 1) depending on the phase difference of the video signal and the state of the previous write. The definition of the states and the change from one state to another are shown explicitly in FIGS. 4 and 5.

Figure 6:
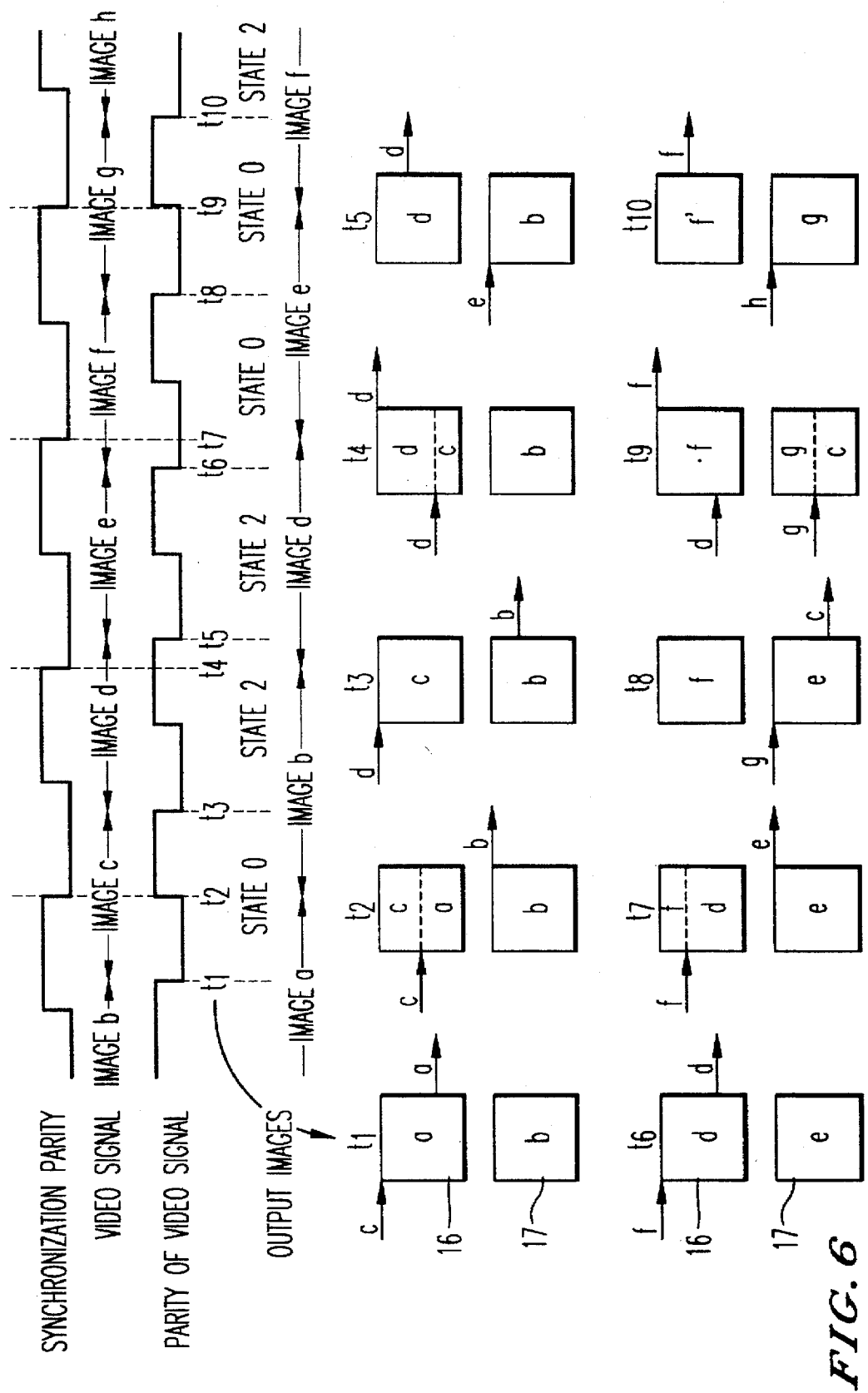
FIG. 6 is a diagram explaining the operation of the invention in the case where the frequency of the video signal is higher than that of the synchronization signal.
Figure 7:
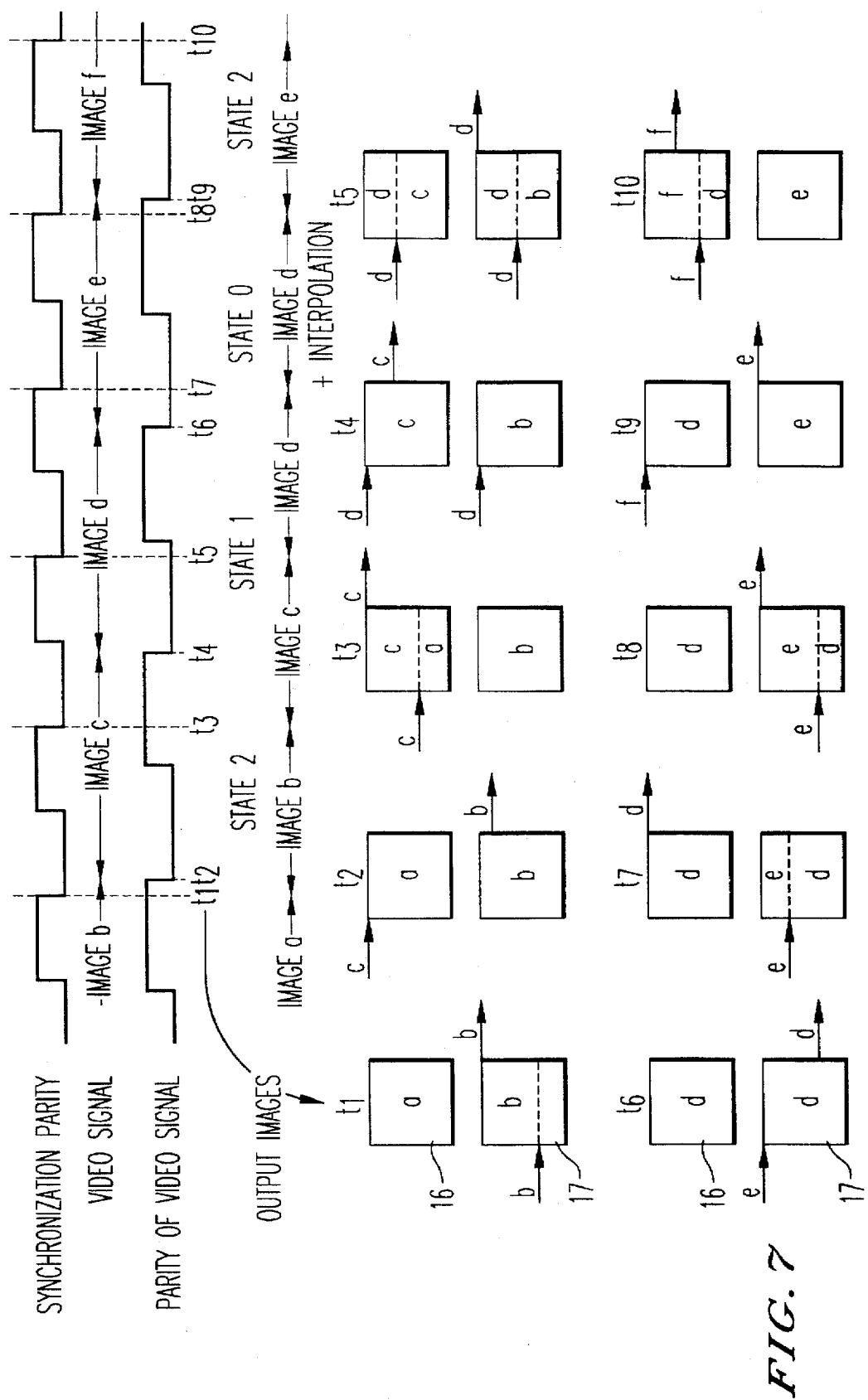
FIG. 7 is a diagram similar to FIG. 6 explaining the operation of the invention in the case where the frequency of the video signal is lower than that of the synchronization signal.

The write management unit 24 controls the writing, at each image write pip, according to the following criterion: if the write state is 0, the write is carried out in the same memory area 16 or 17 as the write in progress. If the write state is 2, the write is carried out in the memory area not being used for the write in progress. If the write state is 1, the write is carried out in both memory areas 16 and 17, whichever one is being used for the write in progress. FIGS. 6 and 7 explain more clearly this criterion for choosing the memory area used, 16 and/or 17.

FIG. 6 illustrates the management of the write in the case where the frequency of the input video signal has deviated relative to the synchronization signal such that the write frequency is higher than the read frequency. The first line of FIG. 6 shows schematically the management of the writing of memories 16, 17 according to the synchronization parity. The image read pips are labeled sequentially t2, t4, t7 and t9. The third line shows the parity of the input video whose write pips are labeled sequentially t1, t3, t5, t6, t8 and t10. Referring to FIG. 3, we can say that the synchronization parity and the parity of the input video are taken respectively from the extraction units 20 and 22.

The second and fourth lines of FIG. 6 show respectively the sequence of images of the input video that will be written into the memories 16, 17, and the sequence of read and synchronized video images output by the synchronizer 13 (FIG. 3). At time t1 (the write pip of image c), we first determine the write state (according to FIG. 4); this is 0 since the number of lines x counted is greater than X2. Next, we determine the memory currently being written; this is 16 containing the image a. There is always a time lag between the writing of an image and its reading in order to perform the synchronization of the video signal. According to the memory selection criterion described above, at time t1 we start writing the image c to memory 16 that contains the image a currently being written.

At time t2, we start reading the image b in the memory 17 while the writing of image c to memory 16 continues. At time t3, we determine the write state which has now become 2 (see FIGS. 4 and 5), and we start writing image d in memory 16, not memory 17 which is presently being read. At time t4, we start reading memory 16 in which the image d is being written. At time t5, we determine the write state, which is 2, to write the image e in memory 17, not memory 16 which is presently being read. At time t6, the write state has become 0, which means that image f will be written to memory 16 which is being read. At time t7, we start reading image e in memory 17 during the writing of image f in memory 16. At time t8, the write state is still 0, so we start writing image g in memory 17 which is currently being read. A time t9, we starting reading image f written in memory 17. At time t10, the write state has become 2, so we start writing image h in memory 17 during reading of image f in memory 16.

We notice in this example that the images c and g will not be read since they are overwritten by the following images d and h. The skipping or suppression of images c and g is necessary in this case to "catch up" on the reading relative to the writing, in order to synchronize the output video signal.

FIG. 7 illustrates a similar case to the one in FIG. 6 in which the input video signal has a lower frequency than the synchronization signal. In this example, the times t1, t3, t5, t7, t8 and t10 are sequentially the images read pips of the synchronization signal, whereas the times t2, t4, t6 and t9 are the image write pips of the input video signal.

At time 1, we start reading image b being written in memory 17. At time t2, the write state is 2, so we start writing image c in memory 16, not memory 17 which is presently being read. At time t3, we start reading image c that is being written to memory 16. At time t4, we determine the write state, which has become 1, and we write image d simultaneously in memories 16 and 17. At time t5, we start reading image d being written to memory 17. At time t6, the write state has become 0, so we write image e to memory 17 which is being read. At time t7, we start reading image d in memory 16 during the writing of image e in memory 17. At time t8, we start reading image e during writing to memory 17. A time t9, the write state has become 2 so we write image f to memory 16, not to memory 17 that is being read. At time t10, we start reading image f being written to memory 16.

As we can see, the image d is read twice (frozen image) in order to compensate the lead of the synchronization signal relative to the input video signal (deviation of frequency tending to slow down the writing relative to the reading). In order to avoid the phenomenon of trembling images during image freezing (image d of FIG. 7), notably in video sequences in which the objects filmed are moving rapidly (for example, a horse race) an interpolation is performed for the second reading of image d.

Figure 8:
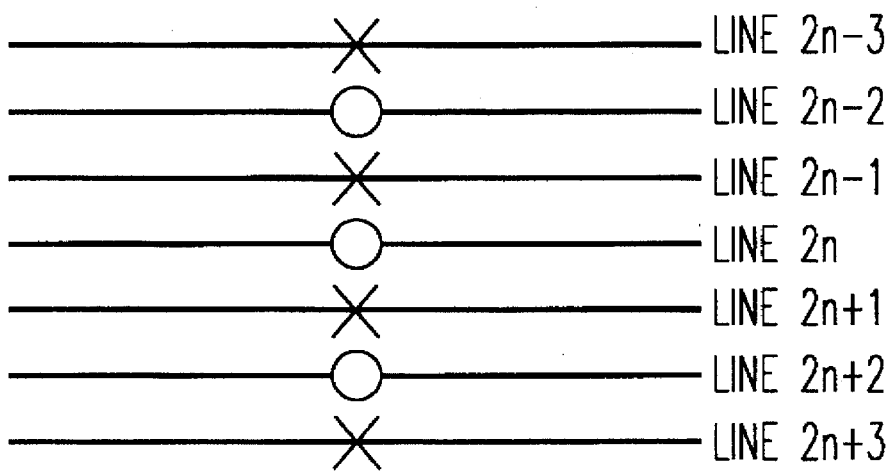
FIG. 8 explains the principle of interpolation of frozen images according to the invention.

The interpolation principle is illustrated in FIG. 8. It consists in using a mathematical algorithm which, from a frame of given parity (for example, odd lines) can calculate the line of the other frame (even lines). The interpolated image d is defined by the following relation:

$$y2n = -\tfrac{1}{16}x_{2n-3} + \tfrac{9}{16}x_{2n-1} + \tfrac{9}{16}x_{2n+1} - \tfrac{1}{16}x_{2n+3}$$

$$y2n+1 = x_{2n+1}$$

where $x_{2n+1}$ represents the lines of the last frame read of image d and y2n and y2n+1 are the even and odd lines (the two frames) of the interpolated image d.

The principle of freezing of images with interpolation according to the invention can also be used to remove parasites generated during switching between the two input video signals. In the case of a synchronous switching (relative to the synchronization signal) of two video signals that are asynchronous or out of phase at the input of the synchronizer 13, the two-image memorization capacity and the specific criteria for managing the reading and writing of these memories that characterize the present invention enable these defects to be remedied by creating a supplementary image which corresponds to the interpolated image from the last frame read of the last image of a first video signal before switching to a second video signal.

Similarly, this same principle can be applied to the asynchronous switching (relative to the synchronization signal) of two video signals that are synchronous but out of phase with each other. The same principle can also be applied for suppression of the video signal input to the synchronizer in order to display permanently the image that is the interpolation of the last image read before suppression of the input signal. In addition, this same principle can be used to improve the freeze frame function, since the interpolated image avoids the flicker associated with repeated reading of the same image when the video sequence includes rapid movement of objects.

The example described above provides tolerance for frequency deviation of the input video signal of about 25% relative to the synchronization signal. This means that the invention is able to conserve a margin of at least a half frame between the writing of an image and its reading. The suppression of an image or the re-reading of an image with interpolation are performed automatically to compensate frequency deviations of the input video signal. For example, for a digital video signal complying with the 4:2:2 standard and having 625 lines per image, the clock frequency of the video signal input to the synchronizer can range from 20.3 MHz to 33.7 MHz for a synchronization signal of 27 MHz (i.e. ±25% of this reference frequency).

The principle of three write states enables the synchronizer's tolerance to frequency deviations to be enlarged to up to about 33%, since nothing prevents us from defining the values X1 and X2 as being integers corresponding respectively to one third and two thirds of the total number of lines X of an image. The principle of management of writing and reading described above is still valid.

From the preceding description it is clear that the invention enables the suppression of an image during the change from state 0 to state 2, and the freezing of an image during the change from state 1 to state 0. The double state 1 and 2 for the interval X1<x<X2 has an important function: it avoids a succession of frozen images in the extreme case of an oscillation of the frequency deviation around the value X2, since the change from state 2 to state 0, and vice versa, does not imply the freezing of an image (FIG. 4). Therefore the synchronized video signal does not include successive frozen images, which would cause visual discomfort.

There remains a problem of successive suppressions of images in this particular case, associated with repeated changes from state 0 to state 2. However, this phenomenon is much less perceptible to the eye than a succession of frozen images.

Figure 9:
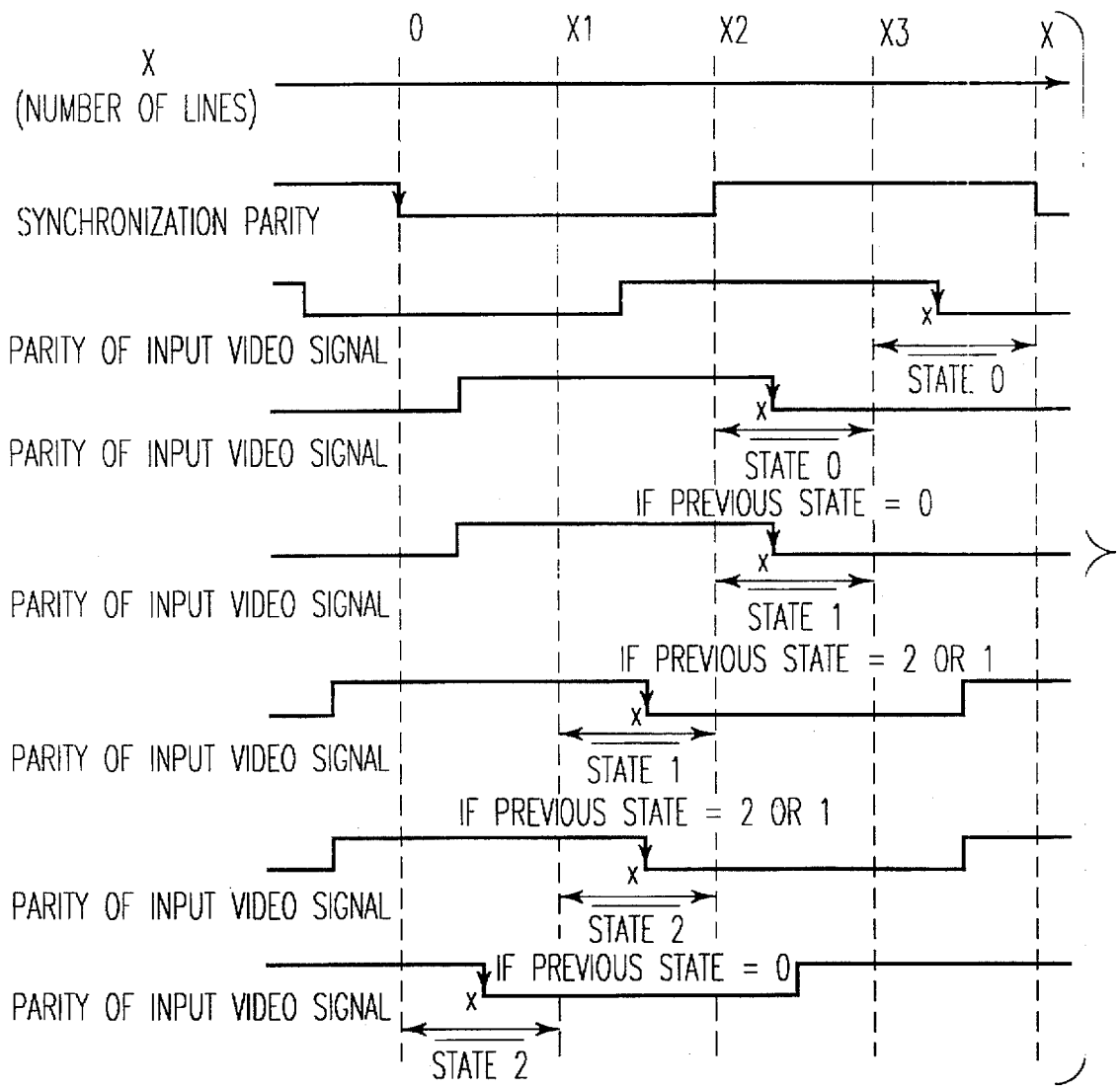
FIGS. 9 and 10 show a variant of the definition of write states relative to those in FIGS. 4 and 5 according to the invention.
Figure 10:
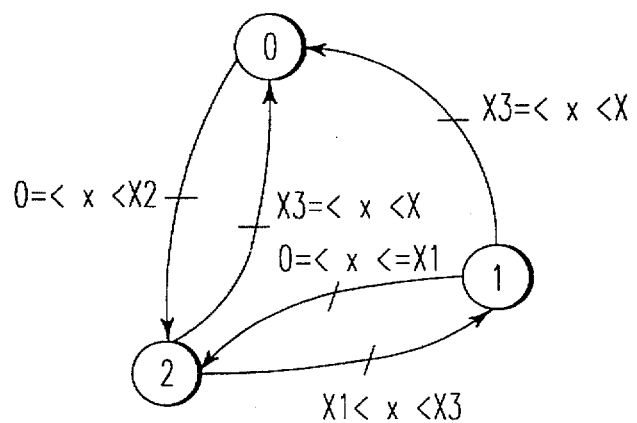

The variant of the invention illustrated in FIGS. 9 and 10 enables suppression not only of a succession of frozen images but also the succession of suppressions of images in this special case. The reason is that the frequency difference oscillation around X2 now causes the following sequence of states: 0-2-2-1-1 . . . , whereas in the variant of FIGS. 4 and 5 the sequence is 0-2-0-2-0 . . .

This new variant will not be described in detail here, because FIGS. 9 and 10 are sufficient in themselves to understand the definition of the states and the changes between states. The division of the reading time of an image into four (X1, X2, X3) implies that the synchronizer's tolerance to the frequency deviations will be limited to 25%.

What is claimed is:

1. Method of synchronization of a digital video signal with respect to a synchronization signal, making use of a memorization unit in which said video signal is written at its own frequency, then re-read at the frequency of said synchronization signal to provide a synchronized video signal, wherein said method consists in:
    defining two parallel memory areas in a memorization unit, each of which can store a video image;
    reading sequentially and alternately the video images stored in said memory areas;
    defining several write states according to a phase difference between a start of writing of an image and a start of reading of an image and to a writing state preceding conditions for changing from one state to another;
    at the start of each writing, determining which memory area is being read and determining the write state, in order to determine whether to write the image in one or both of said memory areas.

2. Method of synchronization according to claim 1, wherein a number of scanning lines separating the start of writing of an image and the start of reading of an image is counted in order to determine the phase difference, the count being reset to zero at the start of each image read.

3. Method of synchronization according to claim 2, wherein three write states are defined depending on the phase difference one state being an intermediate state and the two others being normal states.

4. Method of synchronization according to claim 3, wherein a reading time of an image is divided into three zones (X1, X2, X) according to the number of scanning lines x counted from the start of reading of the image, wherein state 0 corresponds to a condition $X2 \leq x < X$, state 2 corresponds to a condition $x \leq X1$, or $X1 < x < X2$ when a preceding state was 0, state 1 corresponds to a condition $X1 < x < X2$ when the preceding state was 2, and wherein when the state is 0 the image is written in a memory that is being read, when the state is 1 the image is written simultaneously in both the memories, and when the state is 2 the image is written in a memory that is not being read.

5. Method of synchronization according to claim 1, wherein images are frozen by interpolation of a last image read in the following cases:
    if the frequency of said video signal is less than the frequency of said synchronization signal, and when the phase difference between the start of writing of an image and the start of reading of an image becomes less than or equal to one third of the image;
    if a switching between two different input video signals of different phases is performed;
    if an input video signal is suppressed;
    if the input video signal is frozen.

6. Method of synchronization according to claim 1, wherein when the frequency of said video signal is greater than the frequency of said synchronization signal and when the phase difference between start of writing of an image and the start of reading of an image becomes less than one third of the image, an incoming image is written over an image not yet read so as to prevent the latter image from being read.

7. Method of synchronization according to claim 4, wherein the numbers X1 and X2 are integers corresponding respectively to one third and two thirds of the total number of lines X of the image.

8. Method of synchronization according to claim 3, wherein a reading time of an image is divided into four zones (X1, X2, X3, X) according to the number of scanning lines x counted from the start of reading of the image, wherein state 0 corresponds to a condition $X3 \leq x < X$, $X2 \leq x < X3$ when a preceding state was 0, state 2 corresponds to a condition $x \leq X1$, or $X1 < x < X2$ when the preceding state was 0, state 1 corresponds to a condition $X1 < x < X3$ when the preceding state was 2 or 1, and wherein when the state is 0 the image is written in a memory that is being read, when the state is 1 the image is written simultaneously in both the memories, and when the state is 2 the image is written in a memory that is not being read.

9. Method of synchronization according to claim 8, wherein the numbers X1, X2 and X3 are integers corresponding respectively to one quarter, one half and three quarters of the total number of lines of the image.

10. Synchronization device including a memorization unit with two memory areas in which a digital video signal is written at its own frequency, said video signal then being read according to a frequency of a synchronization signal so as to provide a synchronized video signal, characterized in that it includes two parallel memory areas each of which can store one video image, means of determining one of several write states as a function of a phase difference between a start of a writing and a start of a reading of an image and of a previous write state, means of sequential and alternating reading of said memory areas, and means of writing images into one or both of said memory areas according to the write state and a memory area being read.

11. Synchronization device according to claim 10, wherein said means of determining of the write states includes a counter of scanning lines that is reset to zero at the star of each reading of an image, a number of lines separating the start of the writing from the start of the reading determining the phase difference.

12. Synchronization device according to claim 10, characterized in that it includes two extraction units providing frequency and image start writing and start reading characteristics of said video signal on the one hand and of said synchronization signal on the other hand, in order to enable respectively management of the writing and reading of video images in said memory areas.

13. Synchronization device according to claim 10, characterized in that said means of determining of the write state and said means of writing images function wherein a reading time of an image is divided into three zones ($X1$, $X2$, $X$) according to the number of scanning lines x counted from the start of reading of the image, wherein state 0 corresponds to a condition $X2 \leq x < X$, state 2 corresponds to a condition $x \leq X1$, or $X1 < x < X2$ when a preceding state was 0, state 1 corresponds to a condition $X1 < x < X2$ when the preceding state was 2, and wherein when the state is 0 the image is written in a memory that is being read, when the state is 1 the image is written simultaneously in both the memories, and when the state is 2 the image is written in a memory that is not being read.

* * * * *